United States Patent [19]

Ensink et al.

[11] 4,054,011
[45] Oct. 18, 1977

[54] CARAVAN

[75] Inventors: Geradus Johannes Ensink, Noble Park; Klaas Burtele Van Geest, Dandenong, both of Australia

[73] Assignee: Siddons Industries Limited, Victoria, Australia

[21] Appl. No.: 588,880

[22] Filed: June 20, 1975
(Under 37 CFR 1.47)

[51] Int. Cl.$^2$ .............................................. B62C 1/06
[52] U.S. Cl. ............................................ 52/66; 52/67; 296/26; 296/27
[58] Field of Search ....................... 296/26, 27, 137 B; 52/66, 67; D22/3, 5; 124/23; 84/282; 24/23 R, 19, 21, 255R

[56] References Cited

U.S. PATENT DOCUMENTS

| | | | |
|---|---|---|---|
| 982,748 | 1/1911 | Setchell | 124/23 R |
| 2,384,659 | 9/1945 | Wait | 52/66 X |
| 2,538,736 | 1/1951 | Spencer | 52/67 |
| 2,856,645 | 10/1958 | Henmeyer | 296/26 X |
| 3,053,562 | 9/1962 | Farber | 296/137 B |
| 3,359,693 | 12/1967 | Mitas | 52/67 X |
| 3,363,932 | 1/1968 | Mann | 52/67 X |
| 3,381,421 | 5/1968 | Sicklesteel | 52/67 X |
| 3,456,978 | 7/1969 | Daniels et al. | 296/27 X |
| 3,531,151 | 9/1970 | Branfield | 52/66 X |
| 3,560,043 | 2/1971 | Harter | 52/66 X |
| 3,768,855 | 10/1973 | Lane | 52/66 |
| 3,887,226 | 6/1975 | Hart | 296/26 |

FOREIGN PATENT DOCUMENTS

| | | | |
|---|---|---|---|
| 1,139,741 | 7/1957 | France | 52/67 |
| 1,055,221 | 4/1959 | Germany | 52/67 |
| 1,385,118 | 2/1975 | United Kingdom | 296/137 B |

*Primary Examiner*—Leslie Braun
*Attorney, Agent, or Firm*—Depaoli & O'Brien

[57] ABSTRACT

A caravan including a movable roof, a flexible wall portion connecting said movable roof to the remainder of the caravan, and at least one extendible compartment pivotally mounted to a wall of the caravan and being operatively connected to said movable roof such that, in use, said movable roof extends when said at least one extendible compartment is extended.

3 Claims, 11 Drawing Figures

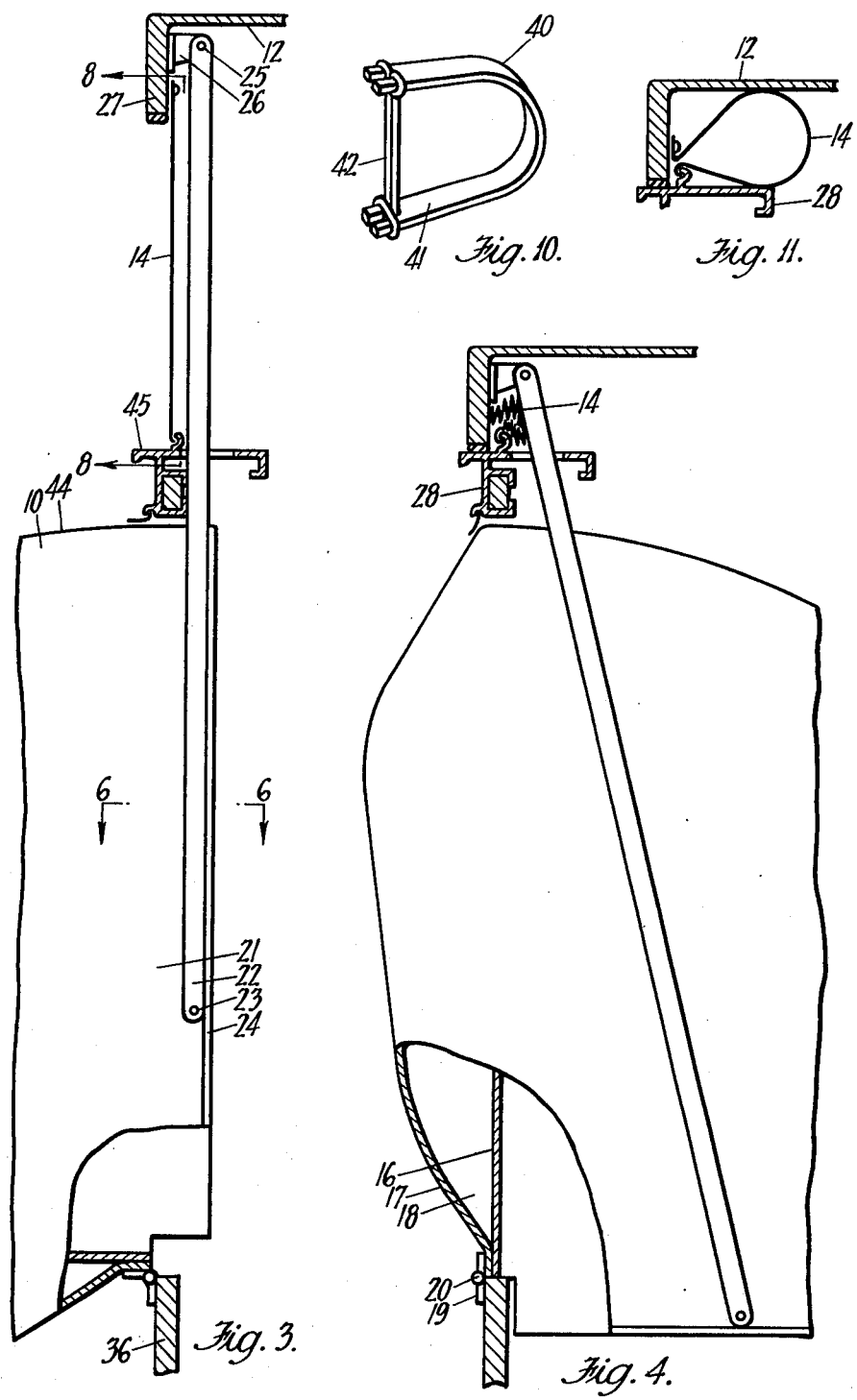

CARAVAN

This invention relates to caravans and particularly, though not exclusively, to caravans of the "collapsable" type.

Many proposals have been put forward in order to provide what is known as a collapsible caravan. Some of these proposals have been successful whilst others have not. The general problem with caravans of this nature is that the internal fittings of the caravan are severely disorganized when in the collapsed state so that large-scale reorganization is necessary when the caravan is expanded to full size.

It is the principal object of the present invention to provide a caravan of the collapsable type wherein the interior of the caravan is not severely disrupted when in the collapsed state.

It is a further object of the present invention to provide a caravan of the collapsible type that is of simple construction and is easy to use.

With these and other objects in mind the present invention provides a caravan including a movable roof, a flexible wall portion connecting said movable roof to the remainder of the caravan, and at least one extendible compartment pivotally mounted to a wall of the caravan and being operatively connected to said movable roof such that, in use, said movable roof extends when said at least one extendible compartment is extended.

The invention also provides an ordering device comprising a strip of resilient material and a band of elastic material, the band in its relaxed state being of a length less than the length of the strip; the parts being arranged so that, in use, the connection of the band to each end of the strip will cause the strip to deform to a C-shape and upon the application of a force the strip will deform against the tension of the band to be approximately straight and upon the release of the force the strip will reform under the tension in the band to the C-shape.

In order that the invention may be clearly understood and readily put into practical effect, there shall now be described with reference to the accompanying illustrative drawings, a preferred construction of a caravan made according to the invention. In the drawings:

FIG. 3 is an enlarged cutaway view of the lifting mechanism in the expanded state;

FIG. 4 is a view corresponding to FIG. 3 in the collapsed state;

FIG. 10 is a perspective view of the ordering device shown in section in FIG. 9; and FIG. 11 is a cutaway schematic view of the flexible wall portion with the ordering device fitted.

Figure 1:
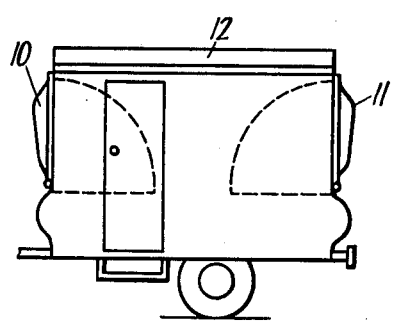
FIG. 1 is a side view of a caravan according to the invention in the collapsed state.
Figure 2:
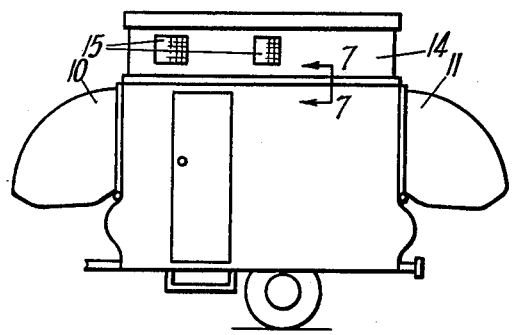
FIG. 2 is a view of the caravan of FIG. 1 in the expanded state.

Referring to the drawings, the caravan according to the invention includes a front end portion 10 and a rear end portion 11 both of which are pivotably rotatable between inner and outer positions (FIGS. 1 and 2). Also provided is a roof 12 movable between upper and lower positions in conjunction with the end portions 10 and 11. Connecting the roof to the remainder of the caravan is a flexible wall portion 14 which may include air vents 15. The flexible wall portion 14 is preferably made of a material such as canvas. The end portions 10 and 11 are preferably used as bed compartments — thus leaving the remainder of the caravan free. The following description relates to the front end portion 10 but is equally applicable to the rear end portion 11.

Figure 6:
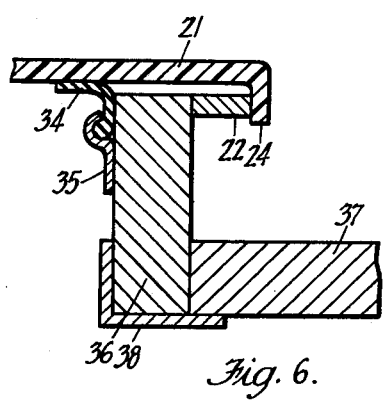
FIG. 6 is a section along the lines of and in the direction of arrows 6—6 in FIG. 3.
Figure 8:
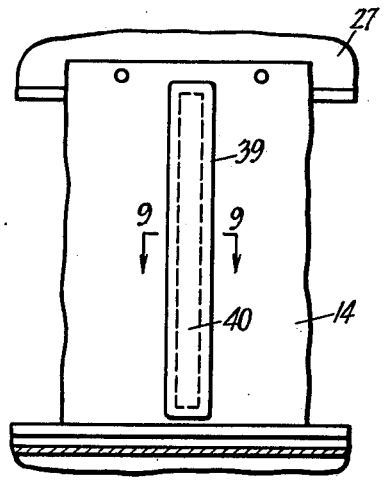
FIG. 8 is a section along the lines of and in the direction of arrows 8—8 in FIG. 3.

The front end portion 10 includes a base 17, and a floor 16 creating an enclosed storage space 18. The base 17 is pivotally mounted to end wall 36 of the caravan by a hinge 19 having a hinge pin 20. The portion 10 also includes two side walls 21 and a curved roof 44, thus leaving the front open, as illustrated by the cutaway in FIG. 3. The side walls 21 are provided with an outstanding rib 24 at or adjacent the open front, so as to prevent the portion 10 expanding beyond the required position by contacting linkage 22 (FIG. 6). Pivotally mounted to side wall 21 by means of pivot 23 are linkages 22. Linkages 22 are pivotally mounted to brackets 26 by means of pins 25, the brackets 26 being fixedly attached to skirting 27 of roof 12. Also attached to skirting 27 is the upper end of the flexible wall portion 14. The skirting 27 is of sufficient length to rest upon the upper surface 44 of a supporting section 28 when the caravan is collapsed.

Figure 5:
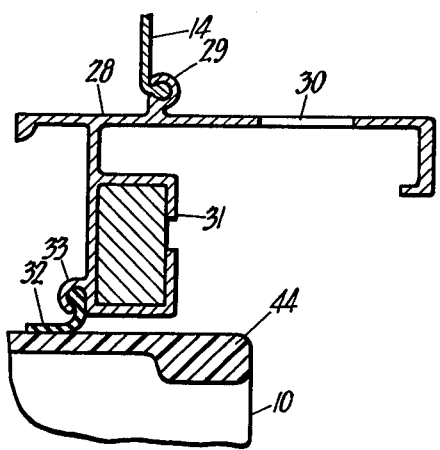
FIG. 5 is an enlarged cutaway view of the support section shown in FIGS. 3 and 4.

The lower end of the flexible wall portion 14 is held in place by a retaining means 29 on the support section 28 (FIG. 5).

The support section 28 also includes a hole 30 for the passage therethrough of linkage 22, a strengthening box section 31 to reinforce the rigidity of section 28, a seal retaining means 33 and a flexible seal 32 sealing with roof 44 of front end portion 10. So as to seal the sides 21 of the portion 10 there is provided flexible seals 34 attached to end wall 36 by means of retaining means 35. (FIG. 6). The end wall of the caravan is attached to side-wall 37 and an L-shaped strengthening member 38 is provided to reinforce the joint.

The flexible wall portion 14 is provided with a plurality of pockets 39, having placed therein an ordering device 40. The purpose of the ordering devices 40 is so that, upon the caravan being collapsed, the flexible wall portion 14 will fold inwardly in an orderly fashion (see FIGS. 4 and 11). The ordering device 40 comprises a strip 41 of a solid but flexible material such as thermoplastic and a resilient elastic band 42 joining the ends of the strip 41 to create a shape approximately a "D". The ordering device 40 is placed in a pocket 39 such that upon the caravan being extended, the strip 41 straightens against the tension in band 42 and upon the caravan being collapsed, the tension in band 42 causes the strip to reassume the "D" shape thus causing the flexible wall portin to be folded inwardly in an orderly fashion (see FIG. 11).

Figure 7:
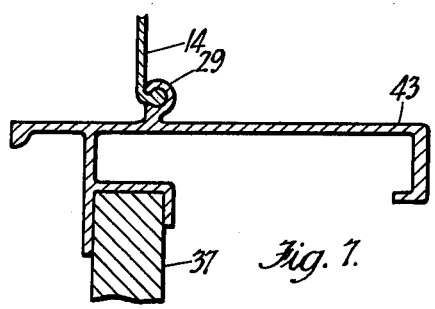
FIG. 7 is a section along the lines of and in the direction of arrows 7—7 in FIG. 2.
Figure 9:
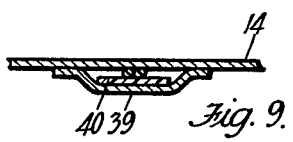
FIG. 9 is a section along the lines of and in the direction of arrows 9—9 in FIG. 8.

The support section 28 is identical at each end of the caravan but along the side walls 37 it assumes the shape illustrated in FIG. 7 with the elongated top surface 43 providing a shelf inside the caravan.

Thus, to extend the caravan all that is required is to swing the end portions 10 and 11 to their extended positions — this automatically raising the roof. Due to the large volume of air displaced during the extension, it is not possible to extend the caravan unless there is an air inlet of sufficient size — such as an open door or window. Thus it is not possible for the caravan to accidentally extend when being towed or parked.

If desired, there may be provided a mechanical means for raising the roof to the extended position with the end portions being extended as a result. This may be done by providing for hollow corner posts mounted to the roof and extending downwardly a length greater than the desired extension height of the roof. These corner posts are mounted in hollow tubes mounted on the caravan. Attached to the top of each tube is a belt or cord which passes down inside the tube, under the corner post, up the tube, then to a winding drum such that upon the drum being rotated, the belt will wind-up on the drum causing the corner posts to lift, thus raising the roof. Preferably, the drum is rotated by means of a handle driving through a gear system.

It will be realized that it is not essential to have exactly two end portions but that there may be any suitable number from one to the maximum capacity of the caravan.

Whilst I have described in the foregoing description a preferred embodiment of the invention, it will be understood by persons skilled in the art that many modifications or variations in details of design or construction may be made without departing from the ambit of the invention, the nature of which is to be ascertained from the following claims.

What we claimed is:

1. A caravan including a movable roof, a flexible wall portion connecting said movable roof to the remainder of the caravan, and at least one extendible compartment pivotally mounted to a wall of the caravan and being operatively connected to said movable roof such that, in use, said movable roof extends when said at least one extendible compartment is extended outwardly, said roof being provided with a peripheral downstanding skirt to which is connected the upper end of said flexible wall portion, the lower end of said flexible wall portion being connected to a retaining means mounted on a support section mounted in the caravan wall, there being provided a linkage having one end pivotally connected to each of the side walls and the other end pivotally connected to said peripheral downstanding skirt, said support section further including an upper surface member having two holes therein for the passage therethrough of the linkages, a strengthening structure, and a second retaining means retaining an upper seal engaging with the top of said at one extendible compartment; said peripheral downstanding skirt resting on said upper surface member when the roof is not extended.

2. A caravan as claimed in claim 1, wherein:
   A. said flexible wall portion is provided with an ordering device for inwardly folding said flexible wall portion;
   B. seals are provided on each end wall of the caravan to sealingly engage with a side wall of said at least one extendible compartment; and
   C. Said seals sealingly engage said side walls and said upper seal sealingly engages said top with sufficient tightness that it is not possible to extend said roof unless a large air inlet is open to the interior of said caravan, whereby it is not possible for said caravan to extend accidentally while parked or being towed.

3. A caravan including a movable roof, a flexible wall portion connecting said movable roof to the remainder of the caravan, at least one extendible compartment pivotally mounted to a wall of the caravan and being operatively connected to said movable roof such that, in use, said movable roof extends when said at least one extendible compartment is extended outwardly, and a plurality of pockets on said flexible wall portion containing an ordering device to keep said flexible wall portion in a desired shape; said ordering device comprising a strip of resilient material in a C-shape and a band of an of an elastic material enclosing the strip to form a D-shape such that upon the caravan being extended the strip deforms to be straight against the tension of the band and upon the caravan being collapsed the strip reforms under the tension of the band to maintain said flexible wall portion in the desired shape.

* * * * *